US007403630B2

(12) United States Patent
Jørgensen et al.

(10) Patent No.: US 7,403,630 B2
(45) Date of Patent: Jul. 22, 2008

(54) MINIATURE HEARING AID INSERT MODULE

(75) Inventors: Martin Bondo Jørgensen, Værløse (DK); Karsten Videbæk, Roskilde (DK)

(73) Assignee: Sonion Roskilde A/S (DK)

( * ) Notice: Subject to any disclaimer, the term of this patent is extended or adjusted under 35 U.S.C. 154(b) by 384 days.

(21) Appl. No.: 10/835,113

(22) Filed: Apr. 30, 2004

(65) Prior Publication Data

US 2004/0258264 A1 Dec. 23, 2004

Related U.S. Application Data

(60) Provisional application No. 60/466,724, filed on May 1, 2003.

(51) Int. Cl.
*H04R 25/00* (2006.01)

(52) U.S. Cl. ...................................... 381/324; 381/323

(58) Field of Classification Search ................. 381/322, 381/323, 328, 314, 324, 329, 330, 380, 312
See application file for complete search history.

(56) References Cited

U.S. PATENT DOCUMENTS

| | | | | |
|---|---|---|---|---|
| 4,584,437 | A | 4/1986 | Giannetti | 179/107 |
| 4,870,688 | A * | 9/1989 | Voroba et al. | 381/60 |
| 5,008,943 | A * | 4/1991 | Arndt et al. | 381/328 |
| 5,201,008 | A | 4/1993 | Arndt et al. | 381/68.6 |
| 5,347,584 | A | 9/1994 | Narisawa | 381/69.2 |
| 5,799,095 | A * | 8/1998 | Hanright | 381/312 |
| 6,144,749 | A * | 11/2000 | Fideler | 381/323 |
| 6,354,990 | B1 | 3/2002 | Juneau et al. | 600/25 |
| 6,430,296 | B1 | 8/2002 | Olsen | |
| 6,493,454 | B1 * | 12/2002 | Loi et al. | 381/328 |
| 7,139,404 | B2 * | 11/2006 | Feeley et al. | 381/330 |
| 2003/0169894 | A1 * | 9/2003 | Lin | 381/323 |
| 2003/0179895 | A1 * | 9/2003 | Doudoukjian | 381/322 |

FOREIGN PATENT DOCUMENTS

| | | | |
|---|---|---|---|
| DE | 4035506 | | 5/1992 |
| DE | 4335941 | | 4/1995 |
| WO | WO 9847319 | A1 * | 10/1998 |
| WO | WO 02/089524 | A1 | 11/2002 |

* cited by examiner

*Primary Examiner*—Sinh Tran
*Assistant Examiner*—Joseph Saunders, Jr.
(74) *Attorney, Agent, or Firm*—Nixon Peabody LLP

(57) ABSTRACT

According to the present invention, there is provided a hearing aid insert module comprising a socket module, and a substantially closed-loop frame comprising electrically conductive portions, the closed-loop frame further comprising engaging means adapted to releasably couple the hearing aid insert module to a faceplate of a hearing aid. The invention is of advantage in that releasable coupling of the faceplate to the socket module via the frame is capable of rendering the insert module easier to manufacture, to user-customize and to repair. The frame is arranged to impart a majority of structural rigidity to the faceplate when inserted therein. Such rigidity is of benefit in that the faceplate is capable in use of applying a flexural component to the frame which could damage the frame if not of sufficiently substantial rigidity.

20 Claims, 9 Drawing Sheets

140
160
20
130
140
140
30
60
130
170
130
110
115
50
150
20
110
115
110
50
115
40
30
100
120
110

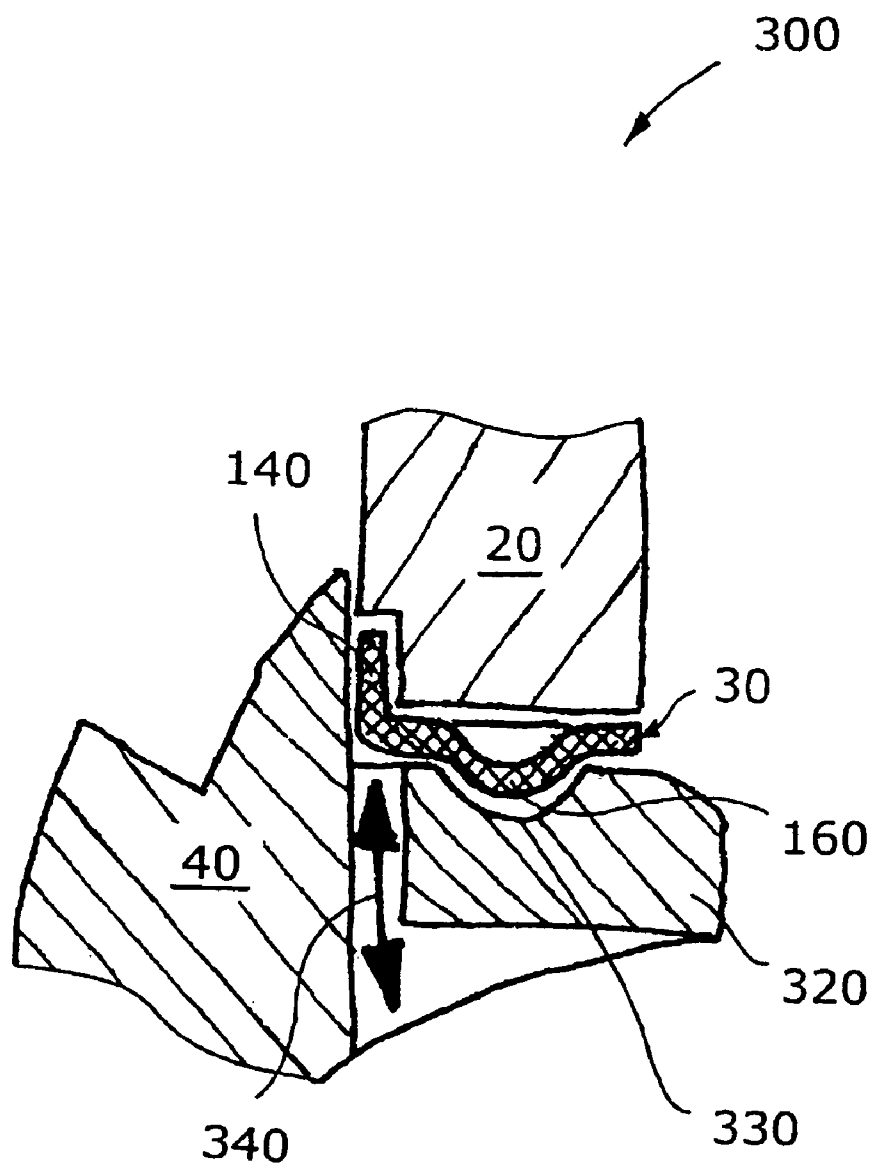
Fig. 4
(Amended)

MINIATURE HEARING AID INSERT MODULE

RELATED APPLICATION

This application claims the benefit of the U.S. Provisional Application 60/466,724, filed on May 1, 2003 and entitled "Miniature Couplable Assembly."

FIELD OF THE INVENTION

The present invention relates to miniature hearing aid insert module comprising a socket module and a substantially closed-loop frame comprising electrically conductive portions. In particular, the present invention relates to a hearing aid insert module having a closed-loop frame having engaging means adapted to releasably couple the hearing aid insert module to e.g. a faceplate or a hearing aid housing.

BACKGROUND TO THE INVENTION

Miniature hearing aid insert modules are known.

In a German national patent application no. DE 43 35 941A1, there is described a hearing aid which is more concealed in use. The hearing aid includes a thin-walled, hard or flexible plastics material faceplate which is design to co-operate with the natural shell-like form of a human pinna. Moreover, the faceplate partially houses an electronic hearing aid amplification module which is also accommodated within an integral projection from the faceplate which is arranged to engage in use into an auditory canal associated with the pinna.

In an international PCT patent application no. PCT/DK02/00261 (publication no. WO 02/089524), there is described a hearing aid comprising a faceplate, a battery holder for accommodating a battery and a signal path incorporated within a shell part. The path includes a microphone coupled to a signal processor coupled in turn to an output acoustic transducer. The battery is connected via its battery holder to the signal processor for providing energization thereto when the aid is operational. The microphone and the battery holder with its associated battery are spatially disposed at the faceplate, whereas the signal processor and the output transducer are disposed in the shell part, the shell part being suitable for insertion into a human auditory canal in use. An insert module associated with the faceplate is used to house electrical connections from the aforesaid battery to the signal processor. Preferably, the insert module serves also to mechanically support the microphone.

U.S. Pat. No. 6,430,296 discloses a modular hearing aid comprising a hollow plug having a generally irregular conical shape and an exterior opening which is covered by a faceplate, in which a recess is formed for removable arrangement of a battery as well as an electronic module. The recess comprises a first region for insertion of the battery and a second region coherent with the first region for placing of a socket part of the electronic module. At the edge of the recess the faceplate is formed with engaging means for the socket part, whereas further parts of the electronic module are placed below the faceplate. The recess is formed such that at removal of the battery the first and second regions together allow passage also of further parts for removal of the complete electronic module from the modular hearing aid.

A disadvantage of the modular hearing aid disclosed in U.S. Pat. No. 6,430,296 is that resilient lugs 19 only contact the edge of the faceplate recess along a minor portion of the edge and leaves coupling between the hearing aid insert module and hearing aid faceplate fragile.

In case of computer aided manufacturing of individual shells for hearing aids technicians now laser scan the ear canal impression and all the resulting data of the shape of the ear is transferred into a specially developed computer modelling software program. Technicians can then design an on-screen 3D-computer model of the ideally shaped custom hearing aid, incorporating all the required miniature components in the available space. The data for this model is then transferred to the stereo lithography apparatus (SLA), which uses a laser to build-up the shell layer-by-layer within a bath of liquid photoplastic acrylic material. The custom shells made by this new process (SLA-shells) have a superior quality and consistency, resulting in smaller sized and better fitting hearing aids for the user. However, SLA-shells suffer from one significant drawback—namely that these shells are more fragile than traditional injection moulded shell parts of thermo-plastic material. Therefore, utilizing a substantially closed-loop frame in accordance with the present invention is a significant advantage since the closed-loop frame allows a large contact area between the insert module and hearing aid faceplate to facilitate a robust coupling.

SUMMARY OF THE INVENTION

According to a first aspect of the present invention, there is provided a hearing aid insert module comprising:

(a) a socket module;

(b) a substantially closed-loop frame comprising electrically conductive portions, the closed-loop frame further comprising engaging means adapted to releasably couple the hearing aid insert module to a surface portion of a hearing aid.

The invention is of advantage in that releasably coupling the surface portion of the hearing aid to the socket module via the frame renders the insert module easier to manufacture, to user-customize and to repair.

In the context of the present invention, it will be appreciated that a "substantially closed-loop" frame is to be construed to include a rectangular-shaped frame structure having a gap or opening in the frame structure as long as the frame structure possesses a mechanical stiffness neutralising the effect of said gap or opening.

In particular, the engaging means may be adapted to releasably coupling the hearing aid insert module to a faceplate of a hearing aid.

Preferably, the frame is arranged to impart a majority of structural rigidity to the surface portion or faceplate when inserted therein. Such rigidity is of benefit in that the surface portion or faceplate is capable in use of applying a flexural component to the frame which could damage the frame if not of sufficiently substantial rigidity.

Preferably, the frame is arranged to accommodate power supplying means therein. Such multifunction is of benefit in that the frame is susceptible to providing synergistically several advantages of rigidity and power supply accommodation. The power supplying means typically comprises a user-replaceable battery; however, other types of power supplying means are additionally or alternatively feasible, for example a photocell to convert optical radiation incident upon the insert module to electrical power to operate electronic processing means connected to the socket module.

Preferably, the insert module additionally comprises a battery lid coupled to the socket module for holding the user-replaceable battery. Such a battery lid renders the power supplying means more concealed when in use in the insert module. More preferably, the lid is pivotally mounted to the socket module. Such pivotal retention of the lid to the socket module is of advantage in that the lid is of relatively small size relative to size of fingers of the user, whereby retention of the lid onto the insert module renders the lid less likely to be dropped, lost or mislaid. Ease of use is of especial importance when the insert module is used by elderly people who suffer one or more of poor eyesight, reduced finger actuation as a consequence of arthritis, and lack of precision of finger movement due to motor neurone disorders such as Parkinson's disease.

Preferably, the battery lid and the frame comprise locking means for snap-fit retaining the battery lid in a locked engagement with the frame. Such snap-fit retention is convenient in use and is capable of preventing unintentional exposure of the supplying means, thereby rendering the insert module potentially more concealed in use.

Preferably, the frame is arranged to hinder disengagement of the surface portion or faceplate therefrom when the supplying means is installed within the insert module. Such hindrance of surface portion or faceplate disengagement from the frame is of benefit in that it is capable of rendering the hearing aid insert module more robust in use.

Preferably, the frame is arranged to function as an electrical connection from the supplying means to processing means connected to the socket module. Such synergistic multifunction of the frame is of advantage in rendering the insert module more compact, easier and less expensive to manufacture and potentially more reliable.

Preferably, the frame comprises a first electrically conductive portion adapted to contact a first power supply terminal of a battery, and a second electrically conductive portion adapted to contact a second power supply terminal of the battery—the first and second electrically conducting portions electrically isolated. Preferably, the first and second electrically conductive portions are electrically isolated by an isolating member forming an integral part of the insert module.

Conveniently, the frame is of pressed-formed sheet metal construction. Press-forming of metal is an inexpensive and rapid method of manufacturing the frame. Moreover, using a metal construction allows the frame to be manufactured in very small dimensions and still maintain a satisfactory strength.

Preferably, the frame comprises one or more outwardly-directed projections for engaging onto upper and lower peripheral surfaces of the surface portion of faceplate. The inventor has appreciated that projection engagement onto outermost upper and lower peripheral surfaces of the surface portion or faceplate is especially beneficial in rendering mechanical coupling between the surface portion or faceplate and the frame robust; such an arrangement should be juxtaposed with an arrangement where the one or more projections engage into a region within the surface portion or faceplate where more projection-plate contact area would superficially be anticipated to enhance robustness.

More preferably, said one or more projections are an integral part of the frame. Such construction potentially simplifies insert module manufacture and renders the insert module more robust.

Preferably, the frame is arranged so that application of releasing forces substantially along one axis is capable of releasing said one or more projections simultaneously from the surface portion or faceplate to enable assembly and/or disassembly of the surface portion or faceplate from the frame.

Preferably, either additionally or alternatively to press-formed sheet metal construction, the frame is fabricated from at least one shaped wire section. Such wire section construction is of benefit in that it is capable of rendering the insert module more compact and light weight. Moreover, the frame is thereby susceptible to being fabricated by forming standard stock wire and thus simplifying manufacture of the insert module. More preferably, said at least one shaped wire section is at least partially moulded into the socket module.

The hearing aid insert module may comprise a programming connector for conveying programming data between the insert module and an external hearing aid fitting system.

The hearing aid insert module may further comprise microphone and/or a user-actuatable push-button.

According to a second aspect of the invention, there is provided a hearing aid comprising a hearing aid insert module which comprises (a) a socket module;

(b) a substantially closed-loop frame comprising electrically conductive portions, the closed-loop frame further comprising engaging means adapted to releasably coupling the hearing aid insert module to a surface portion of a hearing aid.

The hearing aid may comprise a signal processor means and a loudspeaker operatively coupled to the signal processor means.

The hearing aid is of advantage in that its frame is capable of synergistically performing a plurality of functions. It will be appreciated that features of the invention can be combined in any combination without departing from the scope of the invention.

DESCRIPTION OF THE DRAWINGS

Embodiments of the invention will now be described, by way of example only, with reference to the following diagrams wherein:

FIG. 4 is an illustration of an end edge of the frame of FIGS. 2 and 3 in which the frame includes a pressed dimple for more positively retaining the lid of FIG. 2 in engagement with the frame when pivoted into a closed position relative thereto;

DESCRIPTION OF EMBODIMENTS OF THE INVENTION

Figure 1:
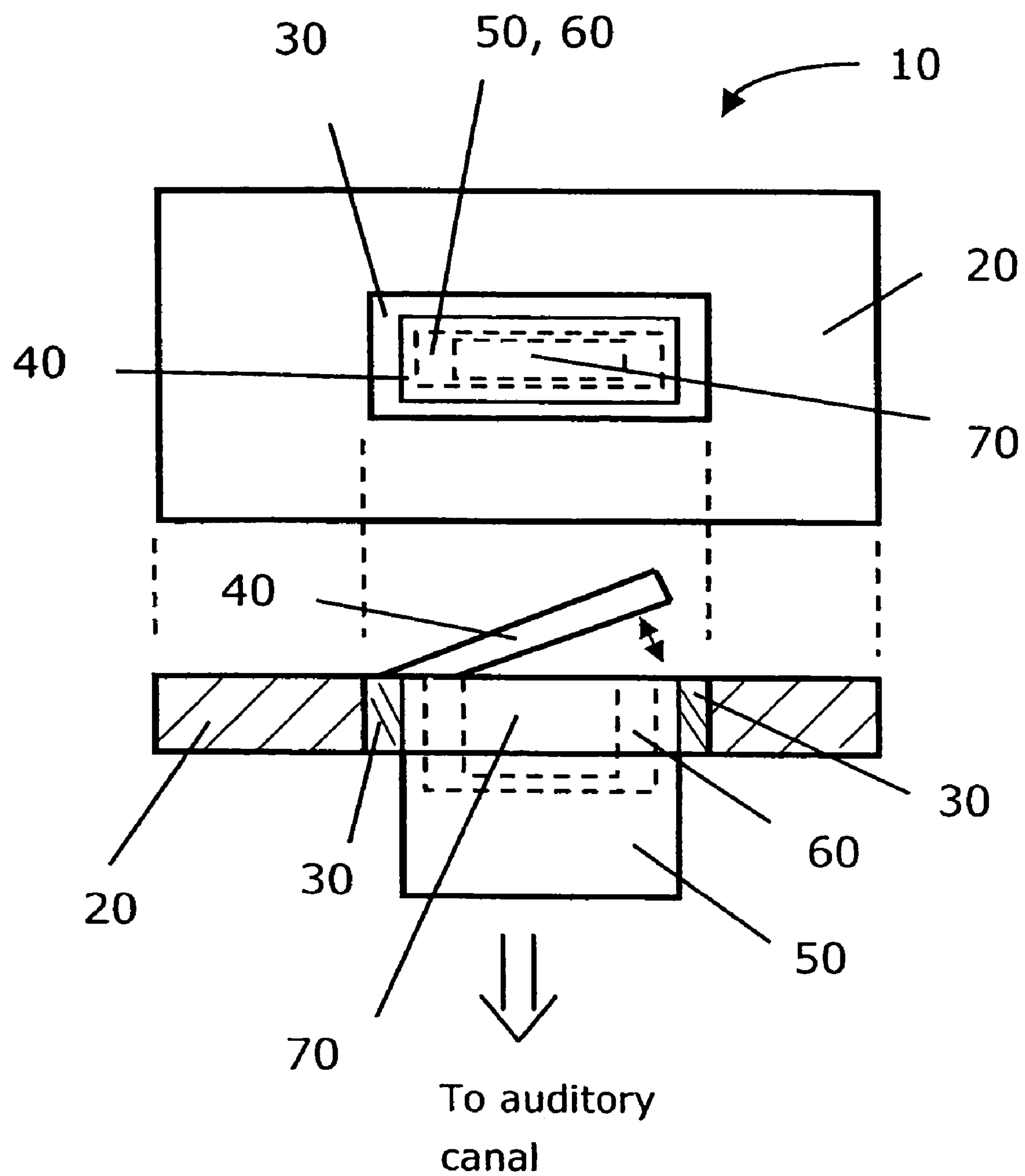
FIG. 1 is a schematic diagram of principal components of a hearing aid insert module according to the invention implemented as a hearing aid.

Referring firstly to FIG. 1, there are shown principal components of a hearing aid insert module according to the invention implemented as part of a hearing aid, the hearing aid being indicated generally by aid 10.

The aid 10 comprises a faceplate 20 shaped to match spatial contours of that region of a human pinna to which the aid 10 is designed to interface. The plate 20 is fabricated from a relatively-thin plastics material sheet which is illustrated as substantially planar but which is susceptible to being fashioned to the profile of the aforesaid human pinna; for example, the plate 20 is susceptible to thermal contouring onto a mould cast impression of the pinna. Alternatively, the plate 20 is susceptible to being fabricated by one or more of stereo lithography and directed plastics material jet moulding. Preferably, the sheet is in a range of 0.1 mm to 1 mm thick, and more preferably in a range of 0.2 to 0.6 mm thick. The sheet preferably comprises one or more layers of material therein for optimizing its physical robustness and appearance.

The aid 10 additionally comprises a peripheral frame 30 to which is pivotally mounted a lid 40, and a socket module 50 suitable for insertion into a human's auditory canal. In a region substantially encircled by the frame 30 and within the socket module 50 immediately behind the lid 40 when in a closed position relative to the socket module 50, there is a recess 60 for receiving a battery 70 for providing electrical power to the aid 10 when in operation. The recess 60 includes compliant electrical contacts for engaging onto electrical terminals of the battery 70. As will be elucidated in greater detail in the following description, the frame 30 preferably synergistically serves several functions, for example it is capable of serving at least in part as the electrical contacts for the battery 70; such an arrangement not only results in fewer piece parts being required to fabricate the aid 10, but also assists to reduce its physical size as well as rendering it more robust in use.

The socket module 50 is adapted to receive an electronic module (not shown) comprising a microphone for receiving sound at the aid 10. Within such electronic module, an electrical output from the microphone is connected to a signal processor and, in turn from the processor, to an acoustic output transducer remote from the plate 20 and the microphone; the microphone, the processor and the output transducer are not shown in FIG. 1. In a simple version of the aid 10, the processor is merely operable to provide an amplification function from the microphone to the output transducer. In more complex versions of the aid, the processor is capable of performing one or more additional functions such as a frequency filtration function, an audio dynamic range compression function, a signal phase adjustment function and a signal frequency shifting (heterodyne) function; other functions are additionally feasible. Preferably, the processing function is implemented digitally and susceptible to modification by way of digital reprogramming.

Operation of the aid 10 will now be described with reference to FIG. 1.

A user of the aid 10 installs the battery 70 therein by pivotally lifting the lid 40 and then inserting the battery 70 into the recess 60 so that electrodes of the battery 70 engage onto the aforesaid electrical contacts of the recess 60. The battery 70 provides electrical power to the processor so that it performs one or more signal processing functions on electrical signals generated from the microphone to provide a corresponding processed output signal for driving the output transducer.

The aid 10 is designed so that the hearing aid module according to the present invention is a standardized component detachable from the plate 20; such construction enables the plate 20 to be customized for each user and then affixed to the hearing aid module for subsequent use by the user. Moreover, the frame 30 is designed to be sufficiently rigid so that the user is able to manipulate the aid 10 by holding its plate 20 whilst pulling on the lid 40 to gain access to the recess 60 and its battery 70 for periodic replacement thereof. Thus, the frame 30 is preferably more relatively rigid than the plate 20. Moreover, the frame 30 is sufficiently rigidly attachable to the plate 20 to remain affixed thereto in normal use. Preferably, the lid 40 is designed to be a retained part of the frame 30. More preferably, the lid 40 is snap-fittable to the frame 30 in a manner which will be elucidated in greater detail in the following description. The frame 30 is beneficially fabricated from a resiliently flexible material, for example a metallic material such as spring steel, phosphor-bronze, or another elastic substantially conductive metal or metal alloy. Alternatively, the frame 30 is susceptible to being fabricated from exotic high-strength materials such as carbon fibre composite and/or Kevlar composite materials.

Figure 2:
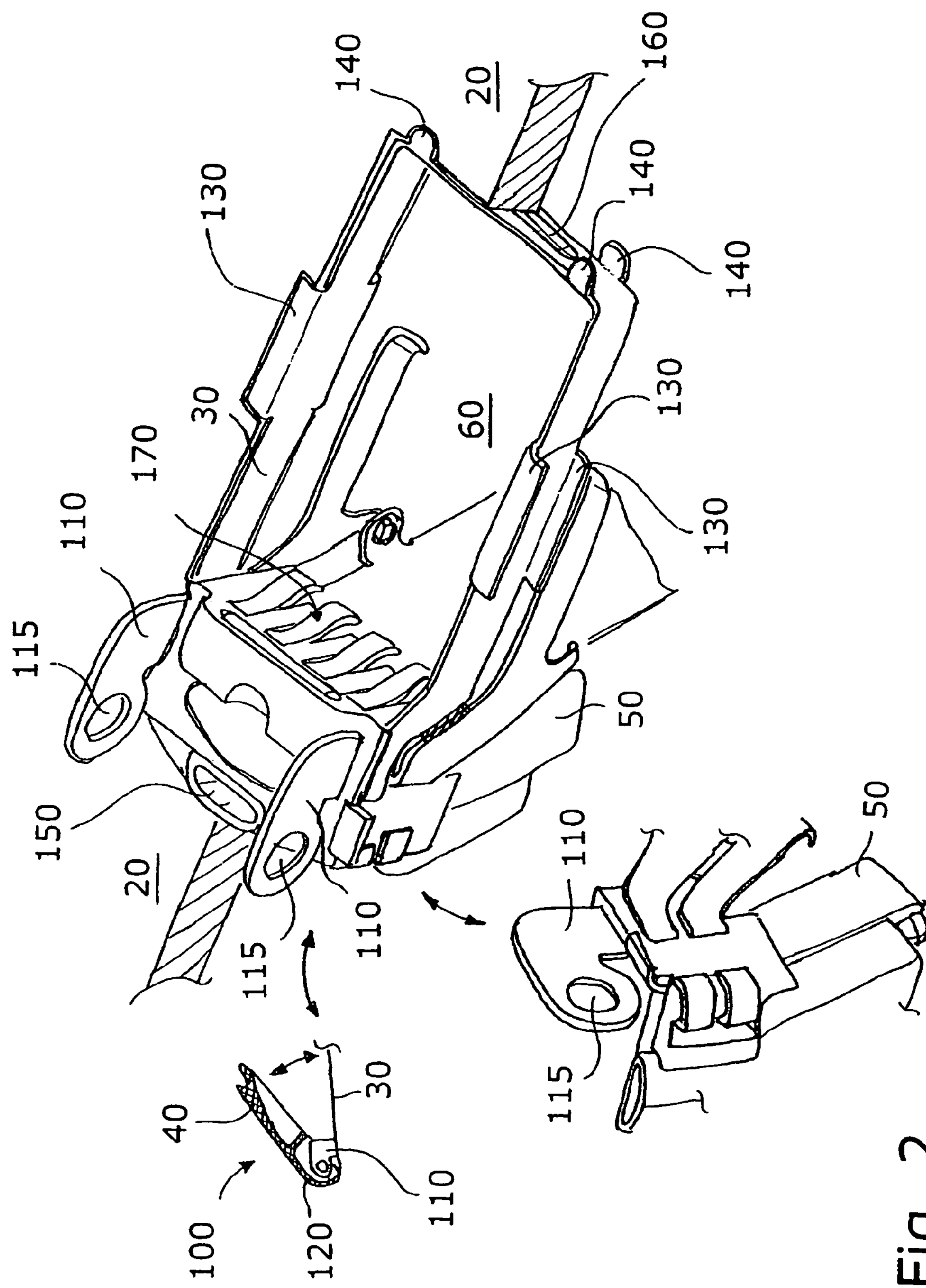
FIG. 2 is an illustration of a socket module, a frame and its associated lid of the insert module in FIG. 1.

Referring next to FIG. 2, there is shown an illustration of the socket module 50 and the lid 40 of the aid 10 of FIG. 1. In FIG. 2, the frame 30 is implemented as a pressed-formed metal component; preferably, the frame 30 is fabricated by metal stamping and/or lithographic electro-etching processes from planar metal sheet followed by subsequent metal pressing operations to form the frame 30 into its shape as illustrated in FIG. 2. The frame 30 includes two upwardly projecting hinges 110 for receiving the lid 40 as indicated by 100. Each hinge 110 comprises an associated hole 115 for receiving a raised dimple (not shown) moulded into a lateral surface of the lid 40, such that the lid 40 is capable of pivoting about an axis intersection a central region of each of the holes 115; preferably, the lid 40 is a plastics material moulded component, although it is also susceptible to being fabricated as a pressed-formed metal sheet component; alternatively, the lid 40 is capable of being fabricated as a hybrid pressed-metal and plastics material moulded component. The lid 40 itself includes a curved section 120 at its end whereat it pivots in use to render the hinges 110 substantially outwardly invisible to the user. Moreover, the frame 30 includes four outwardly-projecting lateral tabs 130 on two most elongate edges of the frame 30 as illustrated, and four outwardly-projecting end tabs 140 on at least one less elongate end edge of the frame 30 as illustrated. Preferably, the lateral tabs 130 are relatively broader than the end tabs 140, the tabs 130 being formed substantially midway along the most elongate edges of the frame 30. Moreover, the lateral tabs 130 are arranged to interface and co-operate with upper and lower major surfaces of the faceplate 20 when engaged thereonto, such interfacing being more apparent in FIG. 5. In contradistinction, the end tabs 140 are formed near corner regions of the frame 30 as illustrated in FIG. 2 and substantially away from a midpoint along the end edge. In a similar manner, the end tabs 140 are arranged to interface and engage onto upper and lower major faces of the faceplate 20. Such upper and lower major face engagement of the frame 30 onto the faceplate 20 is found by the inventor to be highly advantageous to render the aid 10 physically robust and yet straightforward to assemble and/or disassemble.

The frame 30, at its end edge remote from the end tabs 140, also includes an orifice 150 behind which is located the aforesaid microphone. Moreover, at its end edge remote from the hinges 110, the frame 30 includes an inwardly-facing elongate dimple projection 160 whose elongate axis is arranged substantially parallel to the end edge of the frame 30. The dimple projection 160 is conveniently formed by a metal pressing operation.

If required, the frame 30 can be finished as a metallic component. Alternatively, at least in part, it is susceptible to having plastics material moulded therearound, especially in a region in the vicinity of the hinges 110. Moreover, the aid 10 preferably includes a series of four electrical contacts indicated by 170 for providing electrical power connection from the battery 70 to the aforesaid signal processor of the aid 10. The contacts 170 are preferably implemented in a row as illustrated, and are compliant so as to resiliently engage onto corresponding electrical terminals of the battery 70 when inserted into the recess 60.

Figure 3:
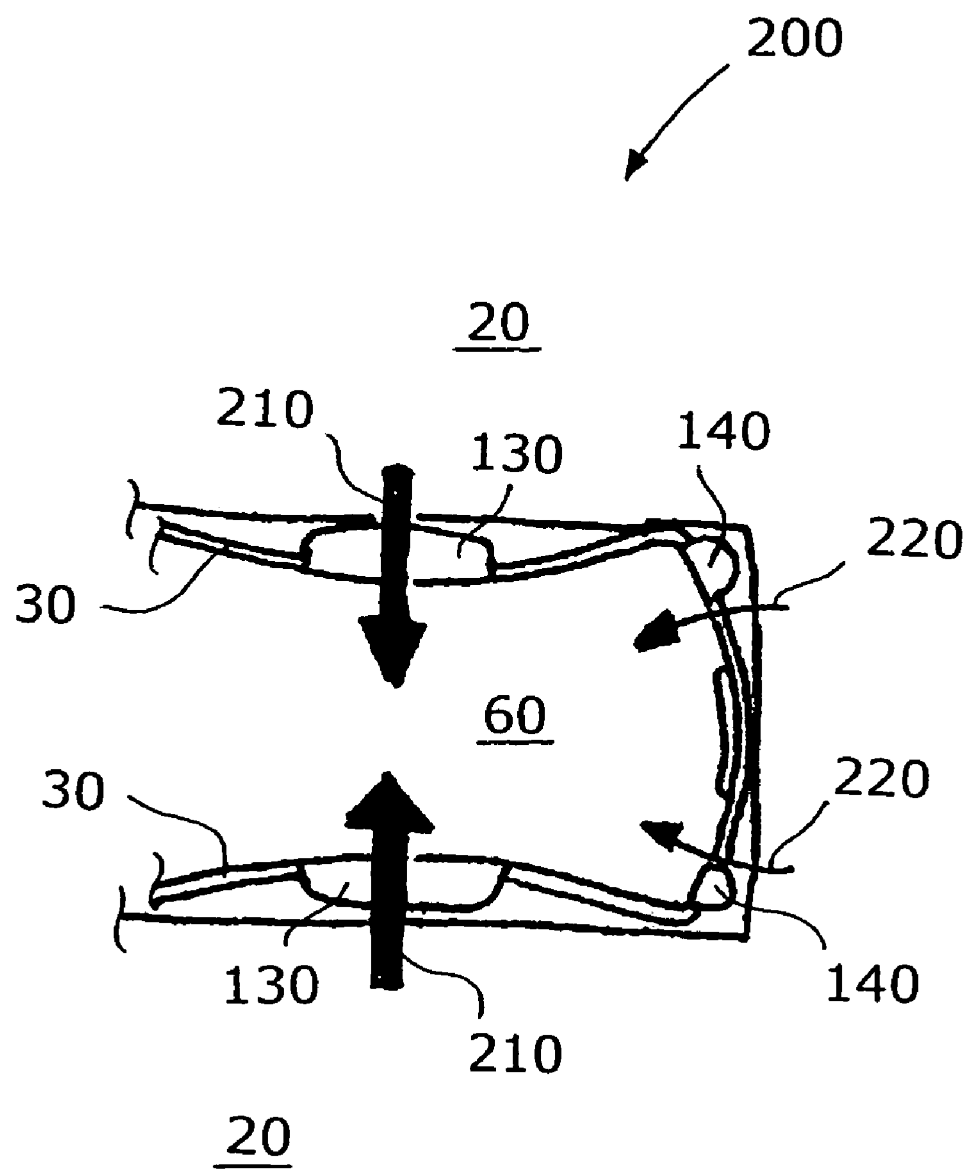
FIG. 3 is an illustration of a part of the frame in FIG. 2 and a manner in which it is susceptible to engage onto a faceplate of the aid.

Referring next to FIG. 3, a section of the frame 30 and a region of the faceplate 20 interfacing thereto are indicated generally by 200. The frame 30 is laterally compliant at its elongate edges so that inward-directed forces 210 applied thereto are susceptible to causing movement 220 at end edges of the frame 30 as illustrated. Thus, application of the forces 210 is susceptible to disengage not only the lateral tabs 130 but also the end tabs 140. Such an arrangement in FIG. 3 is especially beneficial in that it enables the faceplate 20 to be readily and easily robustly engaged to the frame 30 and correspondingly readily intentionally disengaged therefrom; the arrangement is convenient when fabricating the aid 10 and also when replacing the insert module (including socket module and a electronic module connected thereto) or the faceplate 20 due to malfunction thereof or damage thereto respectively. It will be appreciated from FIG. 3 that inclusion of the battery 70 within the recess 60 is capable of preventing the forces 210 causing movement of the tabs 130, 140 to disengage them from the faceplate 20; thus, the arrangement utilized in the aid 10 is not readily susceptible to disassembly when the aid 10 is in use.

Referring now to FIG. 4, regions of the lid 40, the frame 30 and its elongate dimple 160, and the faceplate 20 are shown in greater detail and indicated generally by 300. As described in the foregoing, the elongate dimple 160 is incorporated into the frame 30 for more positively retaining the lid 40 against the frame 30 when in its closed position. The lid 40 includes, preferably integrally therewith by way of plastics material moulding, a projection 320 with an associate indent 330 therein arranged to deformably engage onto the elongate dimple 160 when the lid 40 is closed against the frame 30. Thus, pivotal movement of the lid 40 and its projection 320 causes one or more of the end edge of the frame 30 and the projection 320 to resiliently deform in directions shown by an arrow 340 so that the lid 40 is snap-closeable to the frame 30.

If required, the elongate dimple 160 is susceptible to being included along at least one of the elongate sides of the frame 30, such inclusion being alternative or additional to inclusion of the dimple 160 in the end edge of the frame 30 remote from the hinges 110. However, it will be appreciated that other types of snap-closeable fixtures for the lid 40 to ensure reliable engagement with the frame 30 are possible.

Figure 5:
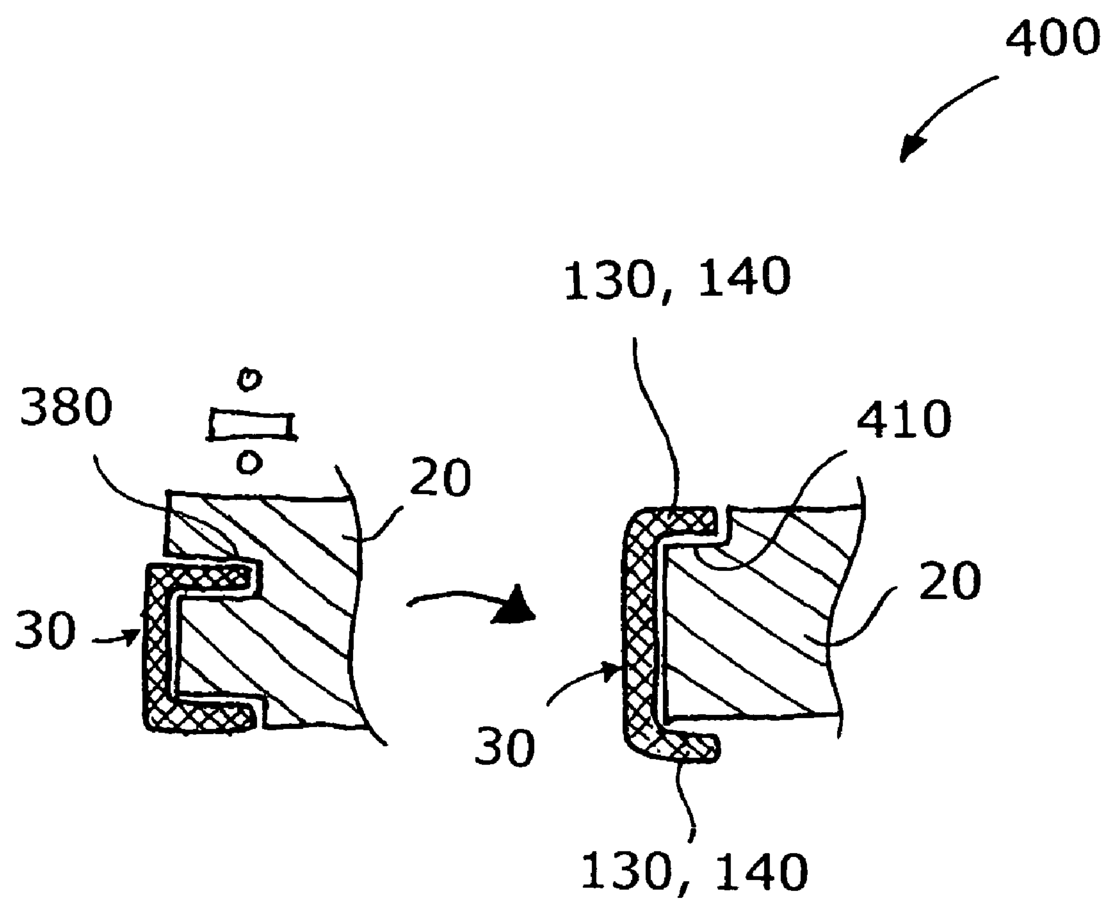
FIG. 5 is a schematic illustration of engagement of the frame with its associated faceplate by way of tabs formed into the frame.

Referring to FIG. 5, there is shown a cross-sectional view of the frame 30 engaging onto the faceplate 20. Although engagement of the frame 30 into a lateral ridge 380 in the faceplate 20 is feasible, an arrangement preferred by the inventor is indicated by 400. The arrangement 400 involves including a recessed step 410 at a peripheral edge of an upper outwardly-directed surface of the faceplate 20 so that the tabs 130, 140 are substantially flush with the upper surface of the plate 20 when the frame 30 is engaged onto the plate 20, thereby providing enhanced aid 10 visual concealment when worn.

Figure 6:
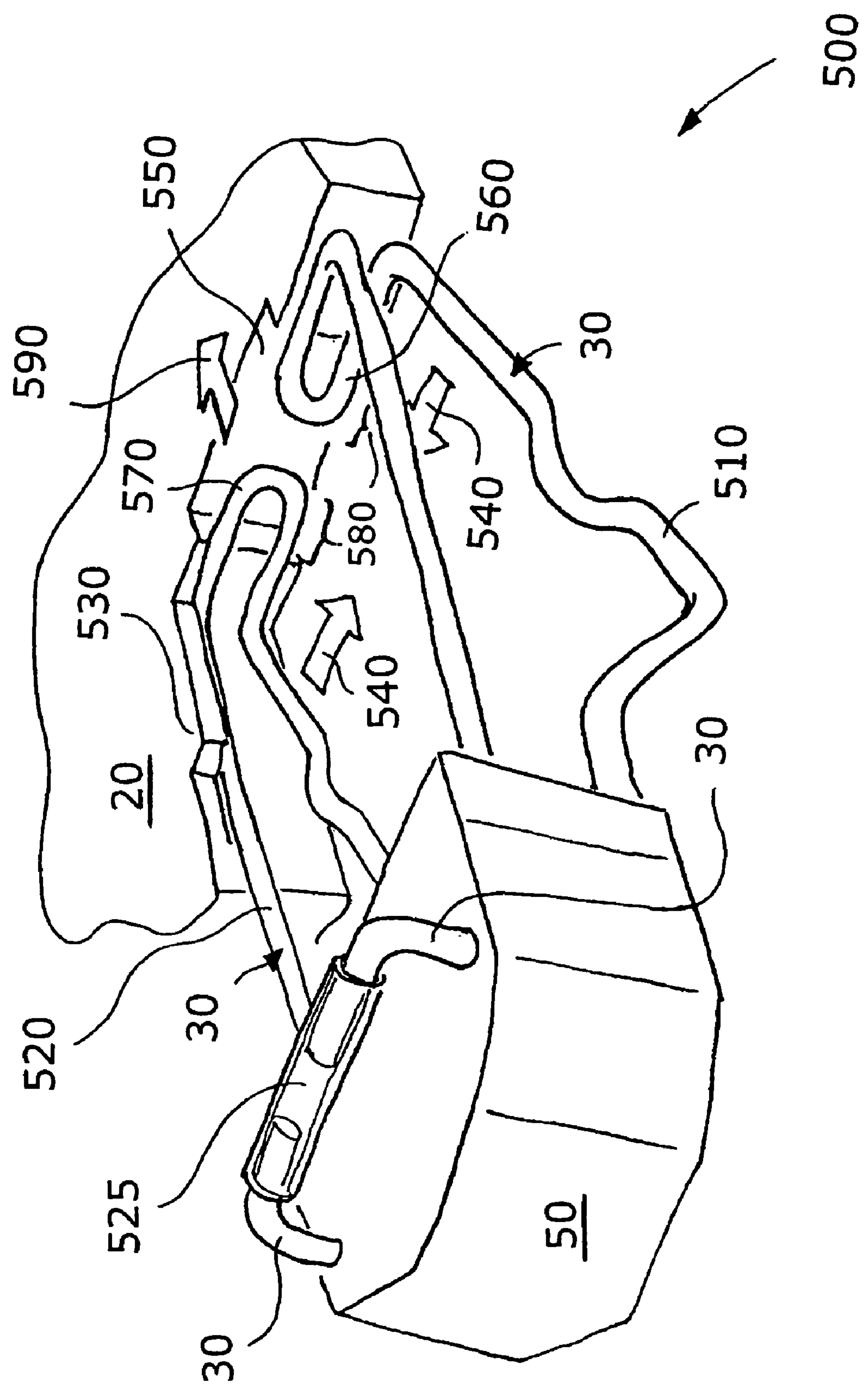
FIG. 6 is an illustration of the aid of FIG. 1 implemented in an alternative manner wherein its frame is fabricated from wire section.

Although the frame 30 is susceptible to being fabricated from pressed-formed metal sheet as described in the foregoing, it is also practicable to fabricate it from elastically resilient wire which is formed by bending to an appropriate shape for implementing the frame 30. In FIG. 6, there is shown an illustration of an alternative implementation of the aid 10 indicated generally by 500 wherein its frame 30 is implemented from resilient wire, for example phosphor bronze wire and/or spring steel wire. The use of wire to form the frame 30 is especially attractive as the frame 30 can be formed from a standard commodity wire and customized for purpose by a single wire-bending process. Moreover, wire is drawn and tempered during its manufacture which imparts to it especially desirable resilient elastic properties appropriate for implementing the frame 30.

In FIG. 6, the frame 30 is implemented using first and second wire sections 510, 520 respectively; the sections 510, 520 are folded back on themselves to provide a greater degree of engagement onto the faceplate 20. At one end thereof, the wire sections 510, 520 are moulded into in an electrically-insulating plastics material block forming a part of the socket module 50 and project therefrom to terminate into an electrically-insulating cylindrical component 525 forming a hinge for the lid 40. The wire sections 510, 520 are arranged to engage onto lateral projections from the faceplate 20, for example the wire section 520 is arranged to engage onto a lateral projection 530 for mechanically retaining the frame 30 onto the faceplate 20 in use. The sections 510, 520 are arranged to be resiliently deflectable by inwardly-directed forces 540 applied for disengaging the sections 510, 520 from the projections 530 in the plate 20 to release the frame 30 from the plate. Such release is preferably not practicable when the battery 70 is included within the frame 30 as inclusion hinders inwardly-directed deflection of the sections 510, 520.

At a region remote from the cylindrical component 525, there is provided a recess 550 in the faceplate 20 as illustrated. The wire sections 510, 520 are fabricated to overhang at their folded-back ends 560, 570 respectively the recess 550 each by a distance 580, such overhang imparting the ends 560, 570 with elastic flexibility in a direction 590 for resiliently contacting onto positive and negative terminals of the battery 70 when installed within the frame 30 formed by the two sections 510, 520. The wire sections 510, 520 are thereby capable of performing several functions synergistically, namely providing mechanical strength to the socket module 50, providing attachment to the faceplate 20 and also providing electrical connections for the battery 70; such synergy is susceptible to rendering the aid 500 potentially at least one of more robust, more compact and less expensive to manufacture.

Figure 7:
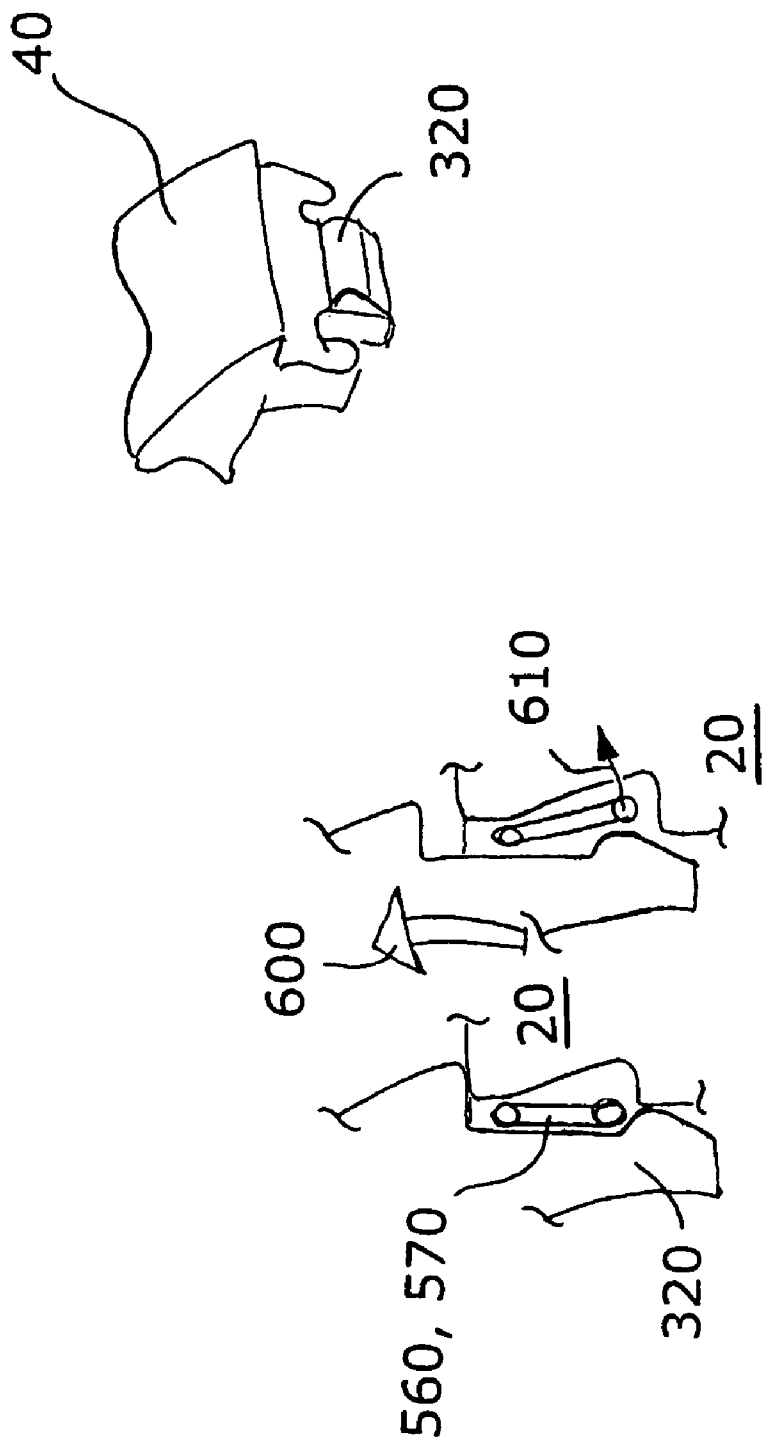
FIG. 7 is an illustration of a snap-engageable lid closure for the aid of FIG. 6.

When the cylindrical component 525 is attached to the lid 40, for example the component 525 being bonded or fused to the lid 40, the component 525 is preferably capable of rotating about its elongate axis relative to the sections 510, 520. More preferably, the lid 40 at its end remote from the component 525 is provided with the projection 320 arranged so as to be also susceptible to engagement in a snap-fit manner onto the ends 560, 570 of the sections 510, 520, thereby also enabling these sections 510, 520 to serve as a closure-locking arrangement for the lid 40. Such a locking arrangement is illustrated in FIG. 7 wherein an upwardly directed force 600 applied to the lid 40 to pivot it relative to the frame 30 when accessing the battery 70 causes the ends 560, 570 to be resiliently directed outwardly, as indicated by an arrow 610, to allow the lid 40 to be released from its snap-closed position.

Figure 8:
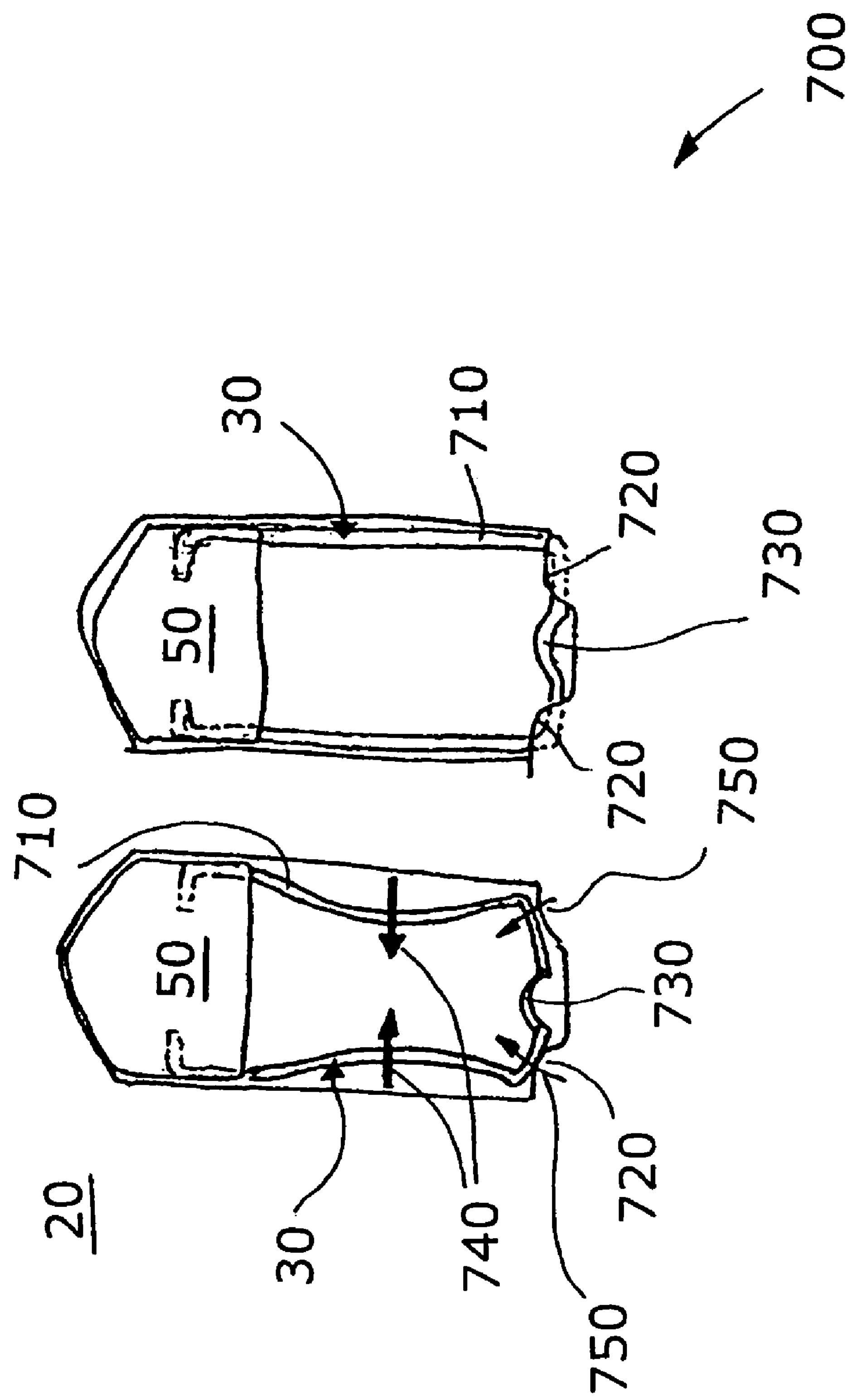
FIG. 8 is a plan view of an insert module according to the invention including a wire section frame.

It will be appreciated that the frame 30 implemented from shaped wire sections can be fabricated in other arrangements to assist with manufacture of a hearing aid according to the invention. For example, in FIG. 8, there is shown an embodiment of a hearing aid according to the invention indicated generally by 700 where the frame 30 is implemented as a loop of wire 710 rigidly attached at its free ends to the socket module 50 as illustrated. The loop 710 is arranged to engage onto projections 720 from the faceplate 20 for retaining the socket module 50 in mechanical connection therewith. Moreover, the loop 710 is so arranged that lateral inwardly-directed forces denoted by arrows 740 are capable of causing orthogonal corners of the loop 710 normally abutting onto the projections 720 to move inwardly as denoted by arrows 750, thereby enabling the frame 30 fabricated as the loop 710 to be disengaged from the faceplate 20; such disengagement is hindered when the battery 70 is included within the frame 30 implemented so. Preferably, the loop 710 includes at a central end region thereof a bent projection 730 suitable for engaging onto the aforementioned projection 320 of the lid 40 for providing snap-fit retention of the lid 40 onto the frame 30.

Figure 9:
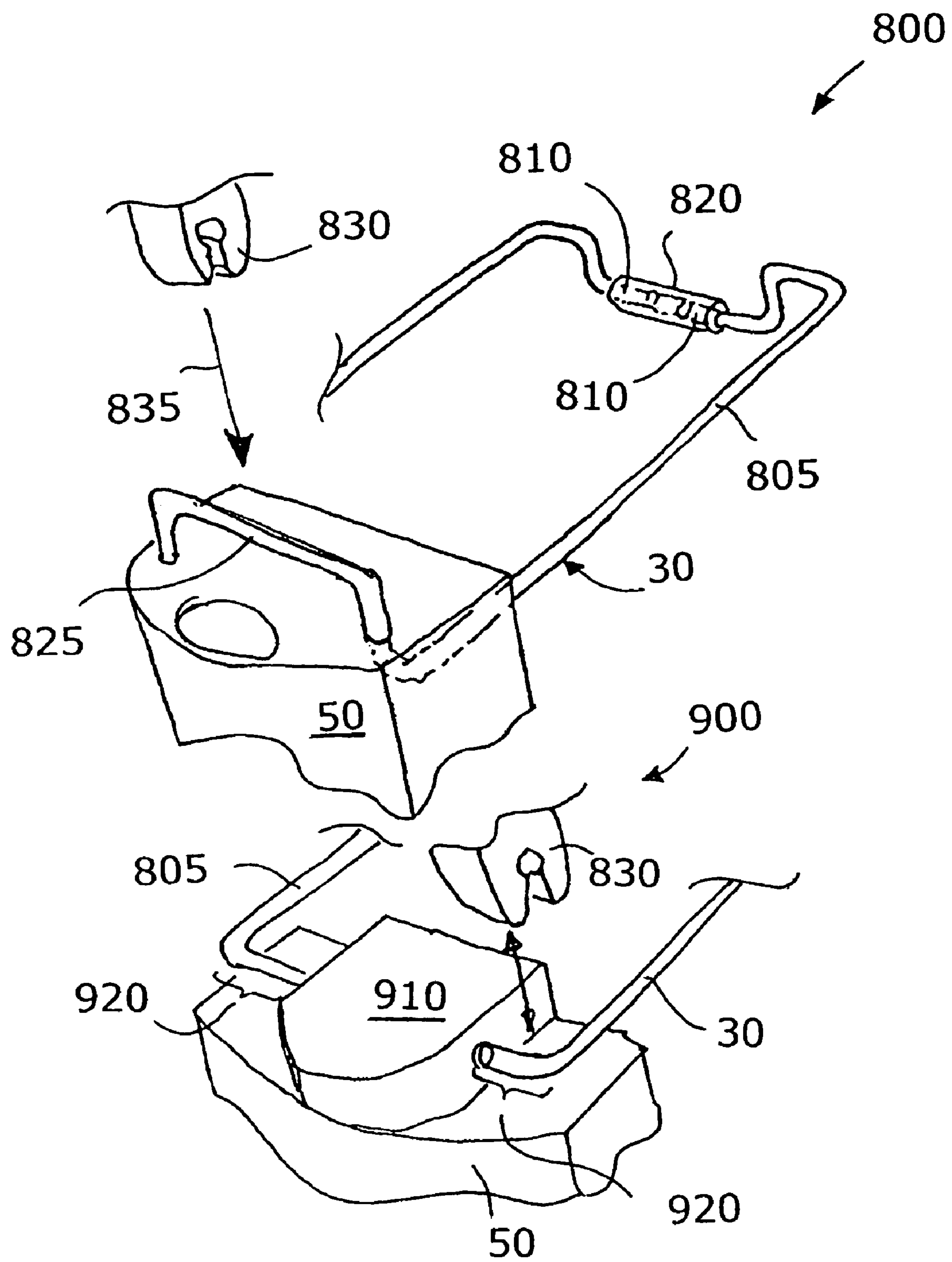
FIG. 9 is a plan view of another insert module according to the invention including a wire section frame.

Further variations when implementing the aid 10 are possible. For example, in FIG. 9, there is shown part of a hearing aid according to the invention indicated generally by 800. The aid 800 incorporates its frame 30 fabricated using a folded section of wire 805 whose free ends 810 are terminated in a cylindrical component 820 as illustrated. The component 820 is capable of functioning as a snap-locking closure for the lid 40 (not shown in FIG. 9) of the aid 800. The wire section 805 is beneficially moulded into the socket module 50 fabricated from moulded plastics material and continued therethrough to form a loop 825 remote from the component 820 and its ends 810. The lid 40 is provided with a snap-fit projection 830 at its pivotal end so that, for example manufacture, it is snap-fittable to the loop 825 as indicated by an arrow 835. Such an arrangement makes for rapid and economical fabrication of the aid 800. In a variation of an aid according to the invention indicated in part by 900, the socket module 50 is provided with a central raised portion 910 into which the wire section 805 terminates as illustrated, the wire section 805 being so formed that two access regions 920 are provided laterally to the raised portion 910 so that one or more snap-fit projections 830 at the pivotal end of the lid 40 are able to snap-engage onto the access regions 920.

It will be appreciated that further modifications can be made to embodiments of the invention described in the foregoing without departing from the scope of the invention. For example, although use of the miniature hearing aid insert module according to the invention to provide hearing aids is described in the foregoing, it will be appreciated that the insert module is susceptible to use in other technical fields.

The invention claimed is:

1. A hearing aid insert module comprising:

(a) a socket module; and (b) a closed-loop frame comprising electrically conductive portions, the closed-loop frame further comprising engaging means adapted to releasably couple the hearing aid insert module to a surface portion of a hearing aid shell, the engaging means comprising a plurality of outwardly-directed projections for engaging onto upper and lower peripheral surfaces of the surface portion, the frame being arranged so that application of inwardly-directed releasing forces thereto substantially along one axis is capable of deforming the frame so as to release said outwardly-directed projections simultaneously from the surface to enable disassembly of the surface portion from the frame.

2. A hearing aid insert module according to claim 1, wherein the outwardly-directed projections are further adapted to releasably couple the hearing aid insert module to a faceplate of a hearing aid.

3. A hearing aid insert module according to claim 1, further comprising a battery lid coupled to the socket module.

4. A hearing aid insert module according to claim 3, wherein the battery lid is pivotally coupled to the socket module.

5. A hearing aid insert module according to claim 3, wherein the substantially closed-loop frame further comprises locking means for snap-fit retention of the battery lid in a closed position relative to the frame.

6. A hearing aid insert module according to claim 3, wherein the electrically conductive portions comprise a first electrically conductive portion adapted to contact a first battery terminal, and a second electrically conductive portion adapted to contact a second battery terminal, the second electrically conducting portion being electrically isolated from the first electrically conducting portion.

7. A hearing aid insert module according to claim 6, wherein the first and second electrically conductive portions are electrically isolated by an isolating member forming an integral part of the insert module.

8. A hearing aid insert module according to claim 1, wherein the frame is arranged to impart a majority of structural rigidity to the surface portion of a hearing aid shell when inserted therein.

9. A hearing aid insert module according to claim 1, wherein the closed-loop frame comprises a pressed-formed sheet metal construction.

10. A hearing aid insert module according to claim 1, wherein said one or more outwardly-directed projections form an integral part of the frame.

11. A hearing aid insert module according to claim 1, wherein the frame is fabricated from at least one shaped wire section.

12. A hearing aid insert module according to claim 11, wherein said at least one shaped wire section is at least partially moulded into the socket module.

13. A hearing aid insert module according to claim 1, wherein the substantially closed-loop frame defines an open interior region for receiving a separate component.

14. A hearing aid insert module according to claim 13, wherein an interior portion of the frame enclosing the open interior region includes the electrically conductive portions.

15. A hearing aid insert module according to claim 14, wherein the separate component is a battery that contacts the electrically conductive portions.

16. A hearing aid insert module according to claim 1, wherein the frame is further arranged so that application of inwardly-directed releasing forces thereto substantially along one axis is capable of deforming the frame so as to release said outwardly-directed projections simultaneously from the surface portion to enable assembly of the surface portion from the frame.

17. A hearing aid insert module comprising:

(a) a socket module; and (b) a closed-loop frame comprising electrically conductive portions, the closed-loop frame further comprising a plurality of engaging members adapted to releasably couple the hearing aid insert module to a surface portion of a hearing aid shell, the engaging members comprising a plurality of outwardly-directed projections adapted to matingly engage corresponding recesses formed in upper or lower peripheral surfaces of the surface portion of the hearing aid shell, the closed-loop frame being arranged so that the application of inwardly-directed releasing forces thereto substantially along one axis deforms the frame to substantially simultaneously disengage the plurality of outwardly-directed projections from mating engagement with the corresponding recesses of the hearing aid shell during disassembly to enable relative movement between the hearing aid insert module and the surface portion of the hearing aid shell during disassembly.

18. A hearing aid insert module according to claim 17, wherein the closed-loop frame is arranged so that the application of inwardly-directed releasing forces thereto substantially along one axis deforms the frame to substantially simultaneously disengage the plurality of outwardly-directed projections from mating engagement with the corresponding recesses of the hearing aid shell during assembly to enable relative movement between the hearing aid insert module and the surface portion of the hearing aid shell during assembly.

19. A method of assembling or disassembling a hearing aid insert module comprising:

providing a hearing aid, the hearing aid comprising a socket module and a closed-loop frame comprising electrically conductive portions, the closed-loop frame further comprising a plurality of engaging members adapted to releasably couple the hearing aid insert module to a surface portion of a hearing aid shell, the engaging members comprising a plurality of outwardly-directed projections adapted to matingly engage corresponding recesses formed in upper or lower peripheral surfaces of the surface portion of the hearing aid shell, the closed-loop frame being arranged so that the application of inwardly-directed releasing forces thereto substantially along one axis deforms the frame to substantially simultaneously disengage the plurality of outwardly-directed projections from mating engagement with the corresponding recesses of the hearing aid shell to enable relative movement between the hearing aid insert module and the surface portion of the hearing aid shell;

applying an inwardly-directed releasing force to the closed-loop frame along one axis during disassembly to deform the frame and disengage the plurality of outwardly-directed projections from mating engagement with the corresponding recesses; and moving the hearing aid insert module relative to the surface portion of the hearing aid shell during disassembly while applying said inwardly-directed releasing force to the closed-loop frame along one axis.

20. A method of assembling or disassembling a hearing aid insert module according to claim 19, comprising:

applying an inwardly-directed releasing force to the closed-loop frame along one axis during assembly to deform the frame and disengage the plurality of outwardly-directed projections from mating engagement with the corresponding recesses; and moving the hearing aid insert module relative to the surface portion of the hearing aid shell during assembly while applying said inwardly-directed releasing force to the closed-loop frame along one axis.

* * * * *

UNITED STATES PATENT AND TRADEMARK OFFICE

CERTIFICATE OF CORRECTION

PATENT NO. : 7,403,630 B2
APPLICATION NO. : 10/835113
DATED : July 22, 2008
INVENTOR(S) : Jørgensen et al.

It is certified that error appears in the above-identified patent and that said Letters Patent is hereby corrected as shown below:

Col. 9, Line 55 Change the term “portion” in claim 1 to read -- surface portion --.

Signed and Sealed this

Twenty-seventh Day of January, 2009

JOHN DOLL
*Acting Director of the United States Patent and Trademark Office*